Figure 1:
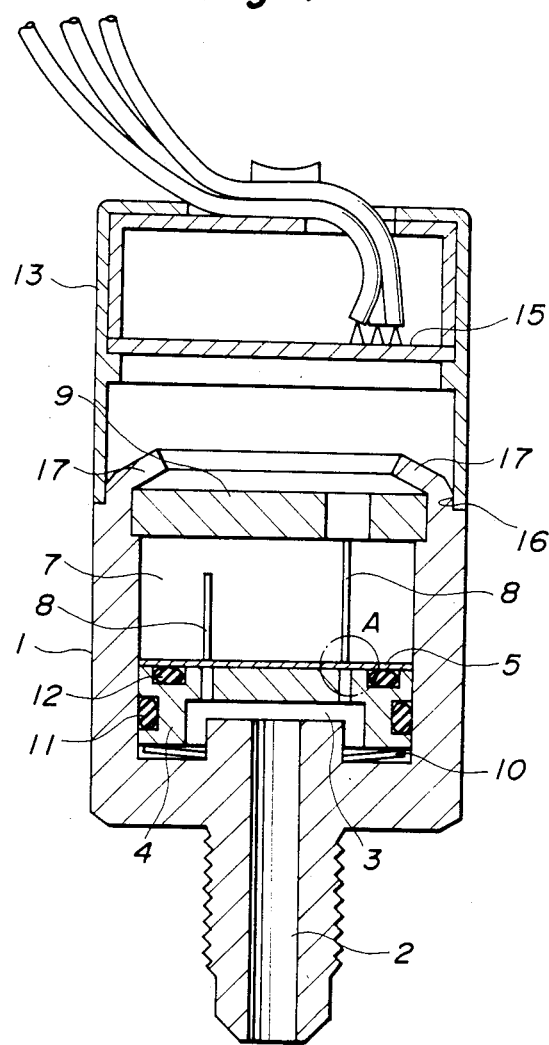

United States Patent [19]

Hattori et al.

[11] Patent Number: 4,706,500
[45] Date of Patent: Nov. 17, 1987

[54] PRESSURE RESPONSIVE SWITCH

[75] Inventors: Kenji Hattori, Tochigi; Etsuo Fujii, Saitama, both of Japan

[73] Assignee: Honda Giken Kogyo Kabushiki Kaisha, Tokyo, Japan

[21] Appl. No.: 832,827

[22] Filed: Feb. 24, 1986

[30] Foreign Application Priority Data

Feb. 22, 1985 [JP] Japan ................................. 60-35027
Feb. 22, 1985 [JP] Japan ................................. 60-35028

[51] Int. Cl.$^4$ ........................... G01L 7/08; G01L 9/10
[52] U.S. Cl. ......................................... 73/728; 336/30
[58] Field of Search ................ 73/722, 728, 708, 753, 73/754; 336/30

[56] References Cited

U.S. PATENT DOCUMENTS 4,412,454 11/1983 Yamashita et al. .................. 73/728

Primary Examiner—Donald O. Woodiel
Attorney, Agent, or Firm—Lyon & Lyon

[57] ABSTRACT

A pressure responsive switch of the amorphous diaphragm type in which an orifice plate having an orifice for passing a pressure medium and an amorphous diaphragm which receives the pressure of said pressure medium are mounted in a case so that they are slidable along an inside surface of said case, whereby the amorphous diaphragm is not subjected to any binding effect of the case.

9 Claims, 2 Drawing Figures

PRESSURE RESPONSIVE SWITCH

The present invention relates to a pressure responsive switch of the amorphous diaphragm type.

Heretofore, in a pressure responsive switch in which a part of a pressure of a pressurized medium passes through an orifice and acts on a surface of an amorphous diaphragm and a mechanical deflection of said diaphragm caused by said pressure is detected by means of a pickup coil in the form of a variation of an electrical signal, it has been a usual practice to fixedly mount the amorphous diaphragm on a case by directly welding the whole peripheral end portion of the amorphous diaphragm onto the case or holding the peripheral end portion of the diaphragm between upper and lower members of a divided case with O-rings interposed therebetween, thereby attaining sealing effect.

In the construction of the amorphous diaphragm the end of which is fixedly mounted on the case, however, a lateral stress caused by a thermal expansion of the amorphous diaphragm itself or the like results in producing direct effect on the output of the pickup coil. There is a further problem that the amorphous diaphragm cannot withstand a large deflection in view of its composition and, consequently, the amorphous diaphragm which is bound at its peripheral portion by a case tends to be broken if it is subjected to a high pressure.

In view of the defects of the conventional amorphous diaphragm, it is an object of the present invention to provide a pressure responsive switch in which an amorphous diaphragm is so mounted that it is not subjected to any binding effect of a case, whereby the effect of a lateral stress is eliminated, and its pressure receiving surface is so arranged as to receive a uniform pressure whereby a local large deflection is avoided and a satisfactory sealing effect is obtained.

In accordance with the present invention there is provided a pressure responsive switch including an amorphous diaphragm in which a pressure of a pressurized medium passes through an orifice and acts on the amorphous diaphragm and a mechanical deflection of said diaphragm caused by the pressure is detected by means of a pickup coil in the form of a variation of an electrical signal, characterized in that an orifice plate having the orifice and the amorphous diaphragm are mounted in a case so that they are slidable along an inside surface of said case, and sealing means are arranged between the plate and the inside wall of the case and between the plate and the amorphous diaphragm.

Figure 2:
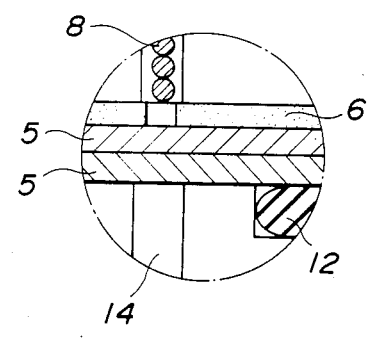

The invention will be explained with reference to the drawings, in which:

FIG. 1 illustrates an embodiment of the pressure responsive switch according to the present invention; and FIG. 2 is an enlarged view of a portion indicated by the circle A in FIG. 1.

Now, a preferred embodiment of the present invention will be explained with reference to the drawings.

As shown in FIG. 1, the pressure responsive switch according to the present invention includes a case 1 having an oil passaqe 2 formed therein and an internal chamber 3 into which an oil pressure is introduced through said oil passage 2. An assembly including an orifice plate 4, an amorphous diaphragm 5, a spacer 6 and a ferrite core 7 having a pickup coil 8 assembled therein is arranged in said case so that said assembly is slidable along the inside surface of said case. The diaphragm 5 is preferably of a laminated, double layer construction of an appropriately flexible material filled with a thin semi-conductor material for producing an electrical response. The spacer 6 may be of rubber or similar material and is provided with a hole therethrough, as shown in FIG. 2. A plate spring 10 (which may be a belleville washer, coil spring or the like) is arranged between the orifice plate 4 and the case 1 to resiliently urge said assembly toward an end plate 9 of the case 1. An O-ring 11 is arranged between the orifice plate 4 and the inside wall of the case to form a side seal and an O-ring 12 is arranged between the orifice plate 4 and the amorphous diaphragm 5 to form a plane seal. A switch circuit unit 13 is integrally assembled, by welding or the like, on a step portion formed on the case 1 at the side of the end plate 9. The orifice plate 4 is provided with one or more orifice holes 14 therethrough. A conventional electric circuit board 15 is provided in the upper portion of the case 1. The ferrite core 7 and pickup coil 8 respond to the pressure imposed on the amorphous diaphragm 5 in a conventional manner to produce a pressure related electrical signal.

In the construction as described above, the amorphous diaphragm 5 itself is not connected to or bound by the case 1 and therefore the ferrite core 7 uniformly receives pressure of the whole surface of the amorphous diaphragm 5 under pressure.

Owing to the independent mounting construction of the orifice plate 4 and the sealing construction including the side sealing O-ring 11 and the plane sealing O-ring 12 arranged on said orifice plate 4, the oil introduced into the chamber 3 is completely prevented from passing through to the side of the ferrite core 7, although the ferrite core 7 also is slidable along the inside surface of the case. Particularly, in case of the O-ring 12 which forms the plane sealing means, a suitable depressing load at the non-pressurized time is assured by the plate spring 10 so that the O-ring is always prepared for a pressure rise beyond its initial seal forming state. In the pressurized state, the orifice plate 4 is movable in such direction that the contact pressure of the close contact between the orifice plate 4 and the amorphous plate 5 can be increased, so that a satisfactory sealing pressure of the O-ring 12 is maintained and a sealing effect can be obtained even if a pulsating pressure is applied by a hydraulic pump or the like.

The pressure receiving area at the underside of the orifice plate 4 is larger, by an amount depending on the positions of the two O-rings 11 and 12 disposed on the orifice plate 4, in order to firmly press the orifice plate 4 against the amorphous diaphragm 5 during the pressurized time, whereby these parts are effectively prevented from forming an incomplete seal therebetween under the influence of the pulsating pressure or the like.

The assembly including the orifice plate 4, the amorphous diaphragm 5, the spacer 6 and the ferrite core 7 is arranged to be pressed against the end plate 9 by the action of the plate spring 10. Accordingly, even if a dimensional error exists in the thickness of any of the components which constitute said assembly, such dimensional error is absorbed by the plate spring 10, whereby the assembly is prevented from rattling in the chamber 3 of the case 1.

The loading direction of the plate spring 10 and the pressurizing direction coincide with each other and, therefore, the pressing force of the plate spring 10 and the oil pressure add to each other to produce a satisfactory sealing effect. If the plate spring 10 is arranged between the end plate 9 and the ferrite core 7, it is possible to obtain the effects of the suitable depressing load of the O-ring 12 during the non-pressurized time and the absorption of the rattling movement of the assembly in the chamber of the case, while the pressing force of the plate spring 10 acts in the opposite direction during the pressurized time, so that the total sealing pressure on the O-ring 12 is not as great and thus an incomplete seal may be produced at a low pressurizing force.

It may be considered that the plate spring 10 is omitted while the orifice plate 4 has a threaded engagement with the case 1 so that the orifice plate can be adjusted relatively to the case to obtain the effects of absorbing the rattling movement of the assembly and securing the suitable depressing pressure. In this case, however, it is required to provide a highly precise machining of the threaded engagement of the orifice plate 4 and the case 1, and it is further required to effect the adjusting operation for positioning said threaded engagement and to provide means for preventing untightening of said threaded engagement, with the result that the assembling operation becomes complicated and it becomes difficult to manufacture the switch in mass production scale.

The end plate 9 is fitted in the step portion 16 of the case 1 and then the opening end of said case is crimped to fix said end plate. The flange 17 indicates the crimped portion.

Before crimping the open end portion of the case 1, the assembly including the plate spring 10, the orifice plate 4, the amorphous diaphragm 5, the spacer 6 and the ferrite core 7 is installed in the chamber 3 through said open end and then the end plate 9 is fixed to the open end by crimping. Thus, the assembling operation of the pressure receiving portions can be easily effected without requiring any special positioning and/or adjusting operation. The only part which requires a relatively high precision in machining are the radial dimensions for the O-ring 11 for forming the side seal. None of the other parts require a particularly high precision in machining and the dimensional error of the parts in the stacking direction thereof is absorbed by the plate spring 10, so that no problem can occur.

In the construction in which the end plate 9 which acts to finally receive the pressuring force is fixedly mounted at the end of the case by the crimping process, it is possible to effect the assembling operation rapidly with uniform results, and it is also possible to obtain a sealing construction of the highly pressurized portion which is integrally formed with the case 1, thereby improving the reliability relative to the mechanical strength of the switch.

It will be understood that the construction of the pressure responsive switch according to the present invention provides various advantages. For example, the amorphous diaphragm, in particular, is so arranged that it is not bound by the case but is slidable along the inside wall of the case, so that it is not subjected to the influence of a stress in lateral direction. The pressure receiving portion is assembled in optimum manner to receive uniform pressure on the pressure receiving surface thereof. The pressure receiving portion can be easily assembled in the case.

What is claimed is:

1. A pressure responsive switch including an orifice plate having an orifice through which a pressure medium passes, an amorphous diaphragm having a surface for receiving a pressure of the pressure medium and a pickup coil for detecting a mechanical deflection of said amorphous diaphragm caused by the pressure of said pressure medium in the form of a variation of an electrical signal, characterized in that the orifice plate and the amorphous diaphragm are so arranged in a case that they are slidable along an inside wall of said case, and sealing means are arranged between the plate and the inside wall of the case and between the plate and the amorphous diaphragm.

2. A pressure responsive switch including an orifice plate having an orifice through which a pressure medium passes, an amorphous diaphragm having a surface for receiving a pressure of the pressure medium and a pickup coil for detecting a mechanical deflection of said amorphous diaphragm caused by the pressure of said pressure medium in the form of a variation of an electrical signal, characterized in that the orifice plate and the amorphous diaphragm are so arranged in a case that they are slidable along an inside wall of said case, sealing means are arranged between the plate and the inside wall of the case and between the plate and the amorphous diaphragm, and a spring means is arranged to urge the plate and the amrophous diaphragm in the pressure receiving direction.

3. A pressure responsive switch including a pressure receiving portion, an amorphous diaphragm arranged in said pressure receiving portion and having a surface for receiving a pressure of a pressure medium and a pickup coil for detecting a mechanical deflection of said amorphous diaphragm caused by the pressure of the pressure medium in the form of a variation of an electrical signal, characterized in that a case has an open end and a closed end with a pressure medium passage through the closed end, said pressure receiving portion having an end plate at one end thereof, said pressure receiving portion housed in the case and fixed in the case by crimping a part of the open end of the case against the end plate.

4. A pressure responsive switch comprising a case with a cylindrical chamber with a cylindrical wall and a pressure fluid opening at a first end of the cylindrical chamber, an electrical pickup coil means mounted in the case at a second end of the cylindrical chamber, an orifice plate slidably mounted in the case at the first end of said cylindrical chamber and having first sealing means for producing a sliding sealed relationships between the cylindrical chamber wall and the orifice plate, an amorphous diaphragm positioned between said orifice plate and said electrical pickup coil means, second sealing means positioned between said amorphous diaphragm and said orifice plate inwardly from said cylindrical chamber wall, and means for communicating pressure from the opening in the first end of the cylindrical chamber to between the amorphous diaphragm and orifice plate inwardly of said second sealing means for exerting a pressure on the electrical pickup means.

5. The pressure responsive switch of claim 4, wherein spring means are provided in the cylindrical chamber urging said the orifice plate and amorphous diaphragm toward each other for maintaining a continuous force on the second seal to insure a continuous seal between said plate and diaphragm regardless of fluid pressure.

6. The pressure responsive switch of claim 4, wherein said orifice plate has a cylindrical outer surface with a groove therein and a flat surface facing the amorphous diaphragm with a groove therein, and an O-ring seal positioned in each said groove for comprising said first and second sealing means.

7. The pressure responsive switch of claim 6, wherein groove in the flat surface of the orifice plate is circular and of a selected diameter smaller than the cylindrical outer surface of the orifice plate for causing a fluid pressure force on the entire orifice plate through said first sealing means to be greater than a fluid pressure force between the orifice plate and the amorphous diaphragm inside the second sealing means.

8. A pressure responsive switch of the type having a fluid pressure chamber, an electrical pickup positioned for having a mechanical pressure applied thereto for producing a variable electrical signal related to the pressure in the chamber and a diaphragm for applying the mechanical pressure to the electrical pickup in response to the fluid pressure, comprising, an orifice plate slidably mounted in and having sliding means sealably engaging the pressure chamber, an amorphous diaphragm positioned between said orifice plate and the electrical pickup, seal means between said orifice plate and amorphous diaphragm, and means for imposing the fluid pressure between the orifice plate and amorphous diaphragm for causing the diaphragm to exert the mechanical pressure on the electric pickup related to fluid pressure and imposing the fluid pressure on the orifice plate in a direction to urge the orifice plate to move toward the amorphous diaphragm for increasing the sealing force therebetween on said seal means.

9. The pressure responsive switch of claim 8, wherein spring means engage and urge said orifice in the said direction.

* * * * *